A. B. MATTINGLY.
ICE MANUFACTURING APPARATUS.
APPLICATION FILED MAR. 1, 1912.

1,041,317.

Patented Oct. 15, 1912.

2 SHEETS—SHEET 1.

Witnesses:

Inventor:
Albertus B. Mattingly

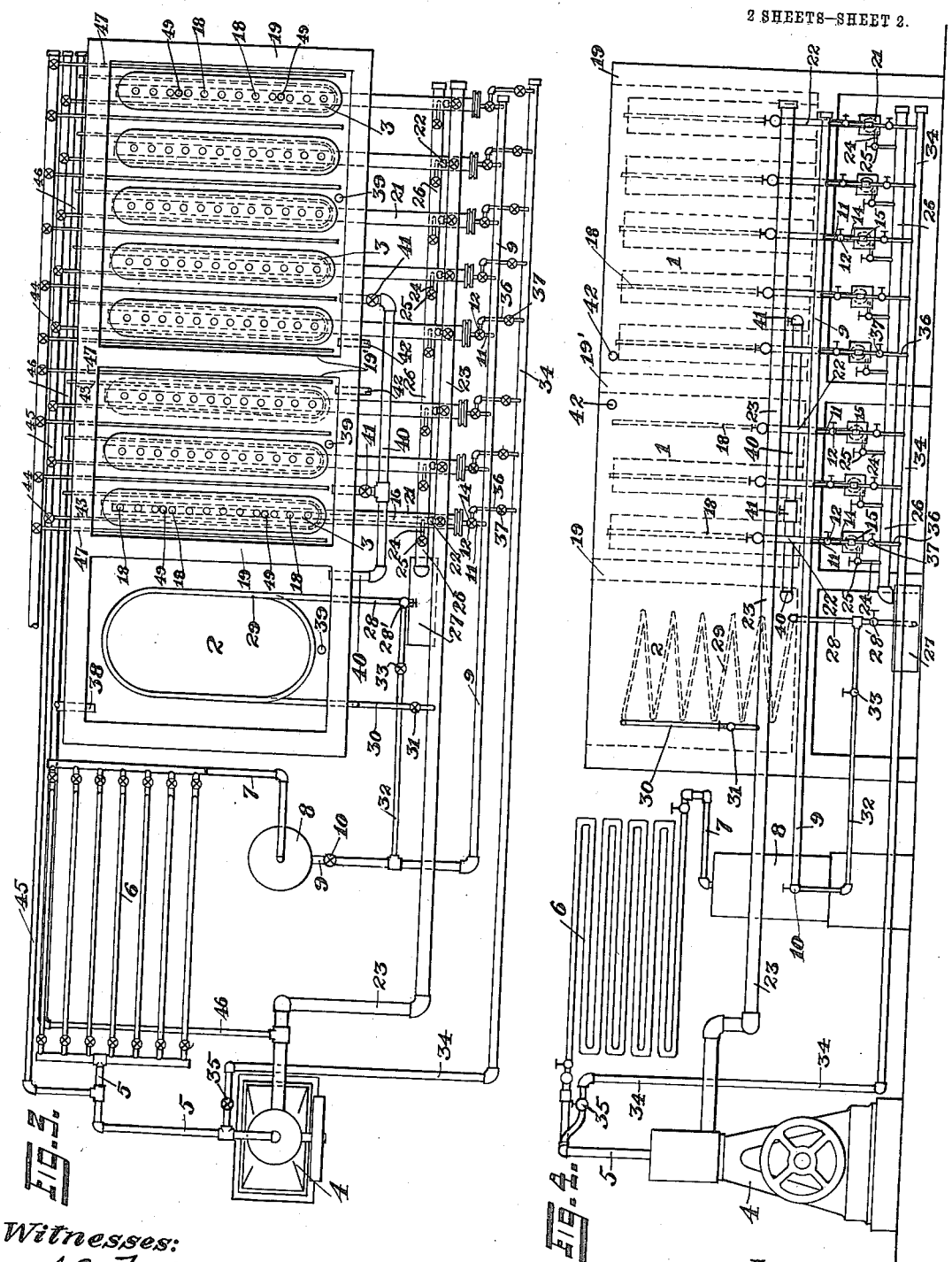

UNITED STATES PATENT OFFICE.

ALBERTUS B. MATTINGLY, OF NEW YORK, N. Y.

ICE-MANUFACTURING APPARATUS.

1,041,317.  Specification of Letters Patent.  Patented Oct. 15, 1912.

Application filed March 1, 1912. Serial No. 680,898.

*To all whom it may concern:*

Be it known that ALBERTUS B. MATTINGLY, a citizen of the United States, and a resident of New York, borough of Manhattan, in the county of New York and State of New York, have invented certain new and useful Improvements in Ice-Manufacturing Apparatus, of which the following is a specification.

This invention relates to improvements in the manufacture of artificial ice, and to provide a more economical means for producing ice and also to decrease the time period for freezing the ice.

The further advantages are economy of space required for the installation of the plant thereby making it adaptable for localities where the ground space is valuable; also the great saving in the cost of construction and simplicity of operation.

With these and other objects in view, it will be seen that I have accomplished the foregoing results, by referring to the accompanying drawings forming a part of this specification of which—

Figure 1:
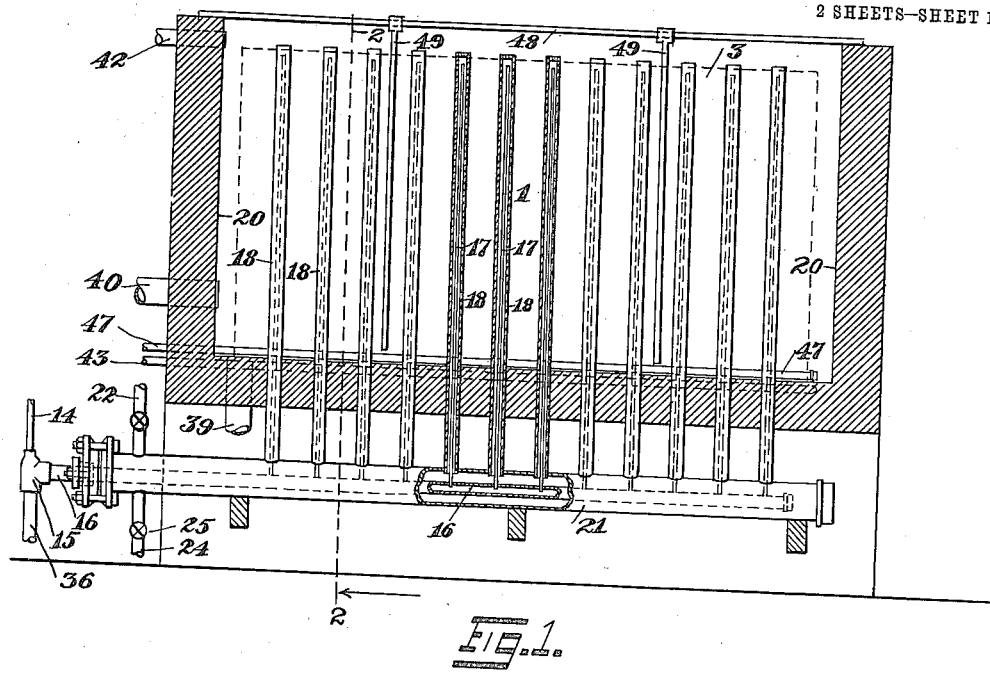
Figure 2:
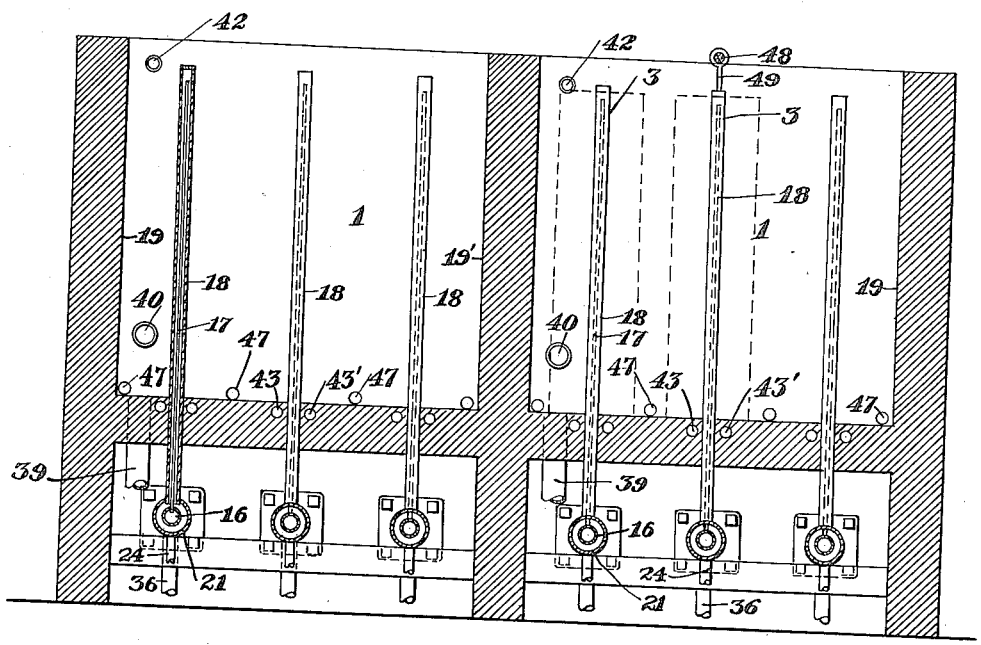

Figure 1 is a vertical section on the line 1—1 of Fig. 3 of one of the ice forming tanks showing one of the freezing plates. Fig. 2 is a vertical section on a transverse line to the section shown in Fig. 1, showing two tanks and taken on line 2—2 of Fig. 1. Fig. 3 is a diagrammatic view showing in plan one general arrangement of an ice plant and showing my method of producing ice. Fig. 4 is a similar view to Fig. 3 but showing the plant in side elevation.

Referring to Fig. 3 it will be seen I have provided a suitable tank system for freezing ice in the form of what is known as plate ice, while I have only shown a combination of two freezing tanks and one cooling tank, 1 and 2, any number of tanks may be used, and any freezing tank may have as many freezing plates 3 in the tank as desired.

Any form of ice machine 4 may be used for compressing the ammonia which is discharged from the compressor through pipe 5, to the condenser 6 which is provided with the usual gauges and valves, and from the condenser through pipe 7 to the receiver 8, from the receiver through pipe 9 which is provided with a valve 10 and a plurality of smaller branch pipes 11, which are each provided with expansion valves 12, having pipes 14 connected to the T-coupling 15 of a manifold 16. The manifolds are provided with a plurality of vertical pipes 17 the top of which are open to allow the ammonia gas to escape into larger pipes 18, which have their upper ends closed (these pipes 18 are secured to or fastened into the bottom of the freezing tank, and are arranged in straight rows), the rows being placed far enough apart so that the plate of ice being frozen upon one row will not come in contact with the ice of the adjacent row, or the end walls 19 or partitions 19' of the tank. The pipes in the rows are placed about five inches apart, and far enough from the side wall 20 to prevent the ends of the plate of ice from freezing to the walls 20. The lower ends of the pipes 18 are secured in a second manifold 21 which incloses the manifold 16 (shown in Figs. 1 and 2).

The gas passes out of the ends of the small pipes 17 and is drawn down through the pipes 18 into the manifold 21, and through the pipe 22 into the main suction pipe 23 of the compressor to go over the above circuit as often as required. A separator for the extraction of oil or grease used in the ice machine may be placed at any convenient place upon the line.

The under sides of each of the manifolds 21 are provided with drain pipes 24 having valves 25, and are connected to a main drain 26 which leads to a secondary receiver 27. This receiver has a pipe 28 and an expansion valve 28', and is connected to the coil 29 within the cooling tank 2. The coil 29 is connected to the main suction pipe 23 by a pipe 30 provided with a valve 31 to regulate the flow of gas through the coil so as to properly reduce the temperature of the water before it enters the freezing tanks.

A pipe 32 having a valve 33, connects the main pipe line 9 of receiver 8 to the secondary receiver 27. This pipe 32 is an emergency line to be used in case the drainage of the manifolds 21 is insufficient for the operation of the coil 29.

The discharge pipe 5 is provided with a small sized branch pipe 34 having a valve 35 and a plurality of branch pipes 36 having valves 37, the pipes 36 connecting the pipe 34 to the manifolds 16 through the T-coupling 15.

The supply or cooling tank 2 has the usual inlet or supply pipe 38 and the drain pipes 39 for properly cleaning the tanks. These pipes 38 and 39 of the several tanks have their proper valves and sources, but it is not deemed necessary to show them.

A pipe line 40 with valves 41 are shown connecting the several freezing tanks to the supply or cooling tank. Each tank is provided with an overflow pipe 42, so as to maintain the water at a fixed level in order to make the ice freeze with a level and uniform top. While the ice is freezing to the bottom of the tank, the level bottom of the tank will perform the operation of keeping the bottom of the ice in a uniform condition. Steam or hot gas pipes 43 and 43' are embedded in the bottom of the tanks and are provided with valves 44 which allow the heat to pass through any set of two independent of the others, in order to thaw any cake of ice from the bottom of the tank without affecting the other cakes. These pipes 43 are connected by a pipe 45 which may be connected to the pipe 5, or to the steam supply. The pipes 43' are connected to a pipe 46 which may be connected to the pipe 23 or to an exhaust pipe.

The pipes 47 are for air and may be connected to any suitable supply such as a compressor or storage tank, the portions within the tank are perforated at intervals and are for agitating the water in order to make the ice straight and clear upon its sides.

A suitable support 48 is placed above each freezing plate 3 from which is suspended eye-bars 49 which hang between the pipes 18. The eye-bars are for lifting the cakes of ice from the tank which may be done by a suitable crane or otherwise.

The operation of the plant is very simple, the circuit of the ammonia having already been described, it is not deemed necessary to repeat it. With water in the freezing tanks, after the temperature has been reduced by the coil 29 in the supply tank, and the ammonia in the receiver 8 at the proper pressure and temperature, the valve 10 is opened and the compressor running to maintain the pressure, the valves 12 are slightly opened consecutively at suitable intervals allowing the ammonia to expand in the plates. The valve 12 nearest to the supply tank is opened first and then the one next to it is opened a little later, and so on until all the valves are opened. (This is done in order that the harvesting of the ice may be made at different times.) The first freezing plate will have the cake of ice partly frozen upon it before the next one is commenced and so on, and thus having the plates of ice maturing one after the other. When a freezing plate has the proper thickness of ice upon it, the expansion valve of that plate is turned off and the valve 35 is turned on allowing the hot gas from the compressor to flow through the pipe 34 until it reaches the valve 36 of this plate which is now opened, and this allows the hot gas to pass through the plate. This thaws the pipes 18 from the plate of ice. The valve 44 has also been opened and the heat passes through the pipes 43 and 43' thus thawing the bottom of the plate of ice from the bottom of the tank. All that remains to be done is to lift the plate of ice from the tank and cut it up for use. The thawing only takes a few minutes and then the valves 44 and 36 are turned off and the valve 25 opened and the plate is drained of any condensed ammonia in a few seconds. The valve 25 is then turned off and the valve 12 is opened slightly and a new cake of ice is started.

It will be seen from the foregoing that only a few minutes are occupied in the actual working time of the freezing plate, for harvesting the ice, thus saving considerable expense in the cost of manufacture.

I claim as my invention:

1. In an ice making apparatus, in combination, a tank, a freezing plate extending upwardly through the bottom of said tank, means for delivering a freezing medium through the freezing plate, means for delivering a thawing medium through the freezing plate, and means for extracting or draining any condensed fluid from the freezing plate.

2. In an ice making apparatus, in combination, a tank, a freezing plate in the form of a plurality of tubes extending up through the bottom of the tank, means for delivering a freezing medium through the tubes for forming a plate of ice upon said tubes, means for delivering a thawing medium to the tubes, and means for extracting or draining any condensed fluid from the freezing plate.

3. In an ice making apparatus, in combination, a tank, a freezing plate in the form of a plurality of tubes extending up through the bottom of the tank, means for delivering a freezing medium through the tubes for forming a plate of ice upon said tubes, means for delivering a thawing medium to the tubes, means for forming a uniform bottom to the plate of ice, and means for extracting or draining any condensed fluid from the freezing plate.

4. In an ice making apparatus, in combination, a tank, a freezing plate in the form of a plurality of tubes extending up through the bottom of the tank, means for delivering a freezing medium through the tubes for forming a plate of ice upon said tubes, means for delivering a thawing medium to the tubes, means for forming a uniform bottom to the plate of ice, means for thawing the ice from the bottom of the tank, and means for extracting or draining any condensed fluid from the freezing plate.

5. In an ice making apparatus, in combination, a tank, a freezing plate extending upwardly through the bottom of said tank, means for delivering a freezing medium through the freezing plate, means for delivering a thawing medium through the freezing plate, means for extracting or draining any condensed fluid from the freezing plate, and means for reducing the temperature of the water before it enters the freezing tank with the drainage from the freezing plate.

6. In an ice making apparatus, in combination, a tank, a freezing plate in the form of a plurality of tubes extending up through the bottom of the tank, means for delivering a freezing medium through the tubes for forming a plate of ice upon said tubes, means for delivering a thawing medium to the tubes, means for extracting or draining any condensed fluid from the freezing plate, and means for reducing the temperature of the water before it enters the freezing tank with the dainage from the freezing plate.

7. In an ice making apparatus, in combination, a tank, a freezing plate in the form of a plurality of tubes extending up through the bottom of the tank, means for delivering a freezing medium through the tubes for forming a plate of ice upon said tubes, means for delivering a thawing medium to the tubes, means for forming a uniform bottom to the plate of ice, means for extracting or draining any condensed fluid from the freezing plate, and means for reducing the temperature of the water before it enters the freezing tank with the drainage from the freezing plate.

8. In an ice making apparatus, in combination, a tank, a freezing plate in the form of a plurality of tubes extending up through the bottom of the tank, means for delivering a freezing medium through the tubes for forming a plate of ice upon said tubes, means for delivering a thawing medium to the tubes, means for forming a uniform bottom to the plate of ice, means for thawing the ice from the bottom of the tank, means for extracting or draining any condensed fluid from the freezing plate, and means for reducing the temperature of the water before it enters the freezing tank with the drainage from the freezing plate.

9. In an ice making apparatus, in combination, a tank, a plurality of freezing plates extending up through the bottom of said tank and all connected to one general supply pipe, means for delivering either a freezing medium or a thawing medium through any freezing plate at will without affecting any of the other plates or stopping them from performing their proper function, means for extracting or draining the condensed fluid from the freezing plates, and means for reducing the temperature of the water before it enters the freezing tank with the drainage from the freezing plates.

10. In an ice making apparatus, in combination, a tank, a plurality of freezing plates extending up through the bottom of said tank and all connected to one general supply pipe and to the suction pipe of the ice machine, means for delivering either a freezing medium or a thawing medium through any freezing plate at will without affecting any of the other plates or stopping them from performing their proper function, means for extracting or draining the condensed fluid from the freezing plates, and means for reducing the temperature of the water before it enters the freezing tank with the drainage from the freezing plates.

Signed at New York, in the county of New York and State of New York.

ALBERTUS B. MATTINGLY.

Witnesses:
F. E. BOYCE,
EDGAR A. FELLOWS.